United States Patent
Rand et al.

(10) Patent No.: US 8,859,686 B2
(45) Date of Patent: Oct. 14, 2014

(54) POLYMETHACRYLIC ACID ANHYDRIDE TELOMERS

(71) Applicant: Rohm and Haas Company, Philadelphia, PA (US)

(72) Inventors: Charles J. Rand, Philadelphia, PA (US); Sudhir M. Mulik, North Wales, PA (US); Thomas Oswald, Lake Jackson, TX (US); C. D. Rodowski, Downingtown, PA (US); Barry Weinstein, Dresher, PA (US)

(73) Assignees: Rohm and Haas Company, Philadelphia, PA (US); Dow Global Technologies, LLC, Midland, MI (US)

( * ) Notice: Subject to any disclaimer, the term of this patent is extended or adjusted under 35 U.S.C. 154(b) by 0 days.

(21) Appl. No.: 14/208,500

(22) Filed: Mar. 13, 2014

(65) Prior Publication Data

US 2014/0275386 A1    Sep. 18, 2014

Related U.S. Application Data

(60) Provisional application No. 61/792,064, filed on Mar. 15, 2013.

(51) Int. Cl.
*C08F 20/02* (2006.01)
*C08K 3/32* (2006.01)

(52) U.S. Cl.
CPC .................................. *C08K 3/32* (2013.01)
USPC .............. 525/329.7; 525/326.6; 525/340; 528/481; 528/502 F; 528/503

(58) Field of Classification Search
USPC ......... 525/326.6, 329.7, 340; 528/481, 502 F, 528/503
See application file for complete search history.

(56) References Cited

U.S. PATENT DOCUMENTS

| | | |
|---|---|---|
| 4,138,541 A | 2/1979 | Cenci et al. |
| 5,130,369 A | 7/1992 | Hughes et al. |
| 5,216,099 A | 6/1993 | Hughes et al. |
| 5,256,746 A | 10/1993 | Blankenship et al. |
| 5,294,686 A | 3/1994 | Fiarman et al. |
| 5,539,071 A | 7/1996 | Steffler |
| 5,614,017 A | 3/1997 | Shawl |
| 6,071,434 A | 6/2000 | Davis et al. |
| 6,384,111 B1 | 5/2002 | Kistenmacher et al. |
| 6,673,885 B1 | 1/2004 | Shibata et al. |
| 7,906,591 B2 | 3/2011 | Weinstein et al. |
| 8,008,374 B2 | 8/2011 | Sulser et al. |
| 8,022,120 B2 | 9/2011 | Becker et al. |
| 2004/0024130 A1 | 2/2004 | Nelson et al. |
| 2006/0004148 A1 | 1/2006 | Sulser et al. |
| 2009/0137746 A1 | 5/2009 | Weinstein et al. |
| 2009/0182061 A1 | 7/2009 | Moro et al. |
| 2010/0069532 A1 | 3/2010 | Uribe Arocha et al. |
| 2010/0273923 A1 | 10/2010 | Suau et al. |

FOREIGN PATENT DOCUMENTS

| | | |
|---|---|---|
| EP | 0516346 A1 | 12/1992 |
| EP | 1942142 A1 | 7/2008 |
| EP | 2033992 A2 | 3/2009 |
| EP | 2072531 A1 | 6/2009 |
| GB | 1595688 A | 8/1981 |
| JP | 04255709 B2 | 4/2009 |
| WO | 2007051858 A2 | 5/2007 |
| WO | 2008068213 A1 | 6/2008 |

OTHER PUBLICATIONS

Bang-Chein Ho et al., "Thermal Degradation of Polymethacrylic Acid," Journal of Polymer Science, Part A: Polymer Chemistry, vol. 30, 1992, pp. 2389-2397.
D. H. Grant et al., "The Thermal Decomposition of Polymethacrylic Acid," Polymer, No. 1, 1960, pp. 125-134.
I. C. McNeill et al., "Thermal Stability and Degradation Mechanisms of Poly(Acrylic Acid) and its Salts: Part 1-Poly (Acrylic Acid)," Polymer Degradation and Stability, vol. 29, 1990, pp. 233-246.
C. A. Fyfe et al., "Investigation of the Thermal Degradation of Poly(acrylic acid) and Poly(methacrylic acid) by High-Resolution 13C CP/MAS NMR Spectroscopy," Macromolecules, vol. 19, 1986, pp. 1909-1912.
A. A. Litmanovich et al., "Peculiarities of Cyclic Anhydride Links Formation in Macromolecules of Polymethacrylic Acid Bound in Complexes with Poly Ethylene Glycols of Various Molecular Masses," JHMS (Journal of High Molecular Compositions), No. 9, 1975, pp. 681-684.

*Primary Examiner* — Robert Jones, Jr.
(74) *Attorney, Agent, or Firm* — Andrew E. C. Merriam

(57) ABSTRACT

The present invention provides compositions of phosphorus acid group and methacrylic anhydride group containing telomeric copolymers of methacrylic acid having an as yet never achieved amount of more than 70 wt. %, or, preferably, 72 wt. % or more, and up to 99 wt. %, of methacrylic anhydride groups based on the total weight of polymerized methacrylic acid and/or salt units. The compositions enjoy higher thermal stability than was previously achieved and enable easer processing that does not require the removal of liquids or solvents.

10 Claims, No Drawings

POLYMETHACRYLIC ACID ANHYDRIDE TELOMERS

The present invention relates to telomeric copolymers of methacrylic acid having an average of more than 70 wt. % to 99 wt. %, preferably, 72 wt. % or more, or, more preferably, 75 wt. % or more, of methacrylic anhydride groups based on the total weight of methacrylic carboxy acid polymerized units in the telomeric copolymer, and to compositions containing them. More particularly, it relates to such copolymers containing one or more phosphorus acid containing groups or residues, preferably, one or more hypophosphite groups or alkyl or dialkyl phosphinate groups.

In contrast to poly(acrylic acid) (pAA), poly(methacrylic acid) does not decarboxylate to a large extent or reproducibly until temperatures reach in excess of 250° C. and are maintained for an extended duration. Owing in part to this marked difference in thermal stability of pMAA and pAA, the two polyacid polymers find different commercial uses as dispersants. P-MAAs are used as dispersants and scale removers in high pressure-temperature boilers and pAAs are valued as dispersants for cooling water and detergent applications (*Handbook of Industrial Water Conditioning*, p. 90-91, 8th. Edition, 1980 Betz Laboratories, Inc., Trevose, Pa.). The known thermal studies that have compared these seemingly similar polyacid polymers analyzed high molecular weight addition polymers having molecular weight in excess of 100,000 and closer to 250,000 daltons such that molecular weight was not regulated in their preparative methods, such as with the use of chain transfer agents.

Poly(methacrylic acid) (pMAA) polymers and copolymers are corrosive to mild steel and known methods for processing them require that they be dissolved in water or dispersed in a solvent, which greatly limits their processing flexibility because removal of water or solvent is costly and time consuming, thereby limiting the ease with which one can make useful products from them.

It has recently been proposed in U.S. patent publication no. 2010/0273923A, to Suau et al., to process (meth)acrylic carboxyl group containing polymers in the dry state, such as by spray drying them. However, such recent proposals do not form methacrylic anhydride groups; and spray drying is not expected to provide anhydride group containing polymers. Rather, spray drying of poly(methacrylic acid) polymers forms dry poly(methacrylic acid) polymers that contain bound water, which complicates processing them and leaves them in a corrosive state. In addition, the need to use costly antioxidants makes the process disclosed in Suau less desirable in practice than is proposed.

An article entitled "Thermal Degradation of Polymethacrylic Acid" by Bang-Chien Ho et al., *Journal of Polymer Science: Part A, Polymer Chemistry*, Vol. 30, 2389-2397 (1992) discloses thermal gravimetric analysis (TGA) of poly(methacrylic acid) having a high molecular weight with a 5° C./min heat ramp as well as isothermal heating at 200° C., 205° C. and 210° C. to make polymers containing methacrylic anhydride. However, the observed formation of methacrylic anhydride during TGA only happens at 220° C.; and, from TGA and the isothermal heating, the article discloses no methacrylic anhydride conversion percentage or yield. The structures of the product methacrylic anhydride group containing polymer are idealized, not demonstrated. Further, the present inventors found with poly(methacrylic acid) that conversion yields of methacrylic acid to anhydride will not be much above 60 wt. %, based on the total weight of carboxy acid polymerized units.

The present inventors have sought to solve the problem of providing novel poly(methacrylic anhydride) polymers or copolymers having a very high methacrylic anhydride content with little or no bound water and therefore, exhibiting limited corrosivity and improved polymer handling properties.

STATEMENT OF THE INVENTION

1. The present invention provides copolymer compositions comprising phosphorus acid group and methacrylic anhydride group containing telomeric copolymers of methacrylic acid and/or its salts having an average of more than 70 wt. % to 99 wt. %, preferably, 72 wt. % or more, or, preferably, 98 wt. % or less, or, more preferably, 75 wt. % or more, of methacrylic anhydride groups, based on the total weight of methacrylic acid polymerized units in the copolymer, all anhydride percentages as determined by titration, and having a weight average molecular weight (Mw) of from 1,000 to 100,000, or, preferably, 2,000 or more, or, preferably, 40,000 or less, or, more preferably, 20,000 or less.

The polymer composition in accordance with the present invention, comprising 72 wt. % or more of methacrylic anhydride groups, based on the total weight of methacrylic acid polymerized units in the corresponding copolymer.

2. In accordance with item 1 of the present invention, the phosphorus acid group and methacrylic anhydride group containing copolymers of the present invention comprise methacrylic acid or salt groups corresponding to methacrylic acid and/or its salt groups that are not converted to anhydride groups.

3. In accordance with items 1 or 2 or the present invention, the phosphorus acid group and methacrylic anhydride group containing telomeric copolymers can comprise the copolymerization product of from 0.1 to 25 wt. %, or, preferably, less than 10 wt. %, based on the total weight of monomers used to make the copolymer, of a vinyl or acrylic comonomer which is resistant to hydrolysis or which can provide desirable flow properties under processing conditions. Such comonomers are preferably methacrylamide, acrylamide, $C_1$ to $C_6$ alkyl methacrylamides, $C_1$ to $C_6$ dialkyl (meth)acrylamides, styrene and alpha-methyl styrene, sulfonated styrene, such as styrene sulfonic acid and its alkali metal salts, cyanostyrene, hydroxystyrene, isopropylacrylamide, t-butylacrylamide, sulfonated acrylamide such as 2-acrylamido-2-methyl-1-propane sulfonic acid and its alkali metal salts.

4. Preferably, the phosphorus acid group and methacrylic anhydride group containing telomeric copolymers of in any of items 1, 2, or 3 of present invention have on average at least one phosphorus atom in the polymer that is bound to a carbon atom of the polymer backbone, as a terminal or pendant group. The at least one phosphorus atom in the polymer backbone can be bound to two carbon atoms, as a phosphite along the carbon chain, such as a dialkyl phosphinate, can be bound to one carbon atom of the polymer backbone, such as a hypophosphite or its salt, an alkyl phosphinate, or the polymer compositions can comprise a mixture of polymers having at least one phosphorus atom in the polymer backbone bound to two carbon atoms and polymers having at least one phosphorus atom in the polymer backbone bound to one carbon atom thereof.

5. In accordance with any of items 1, 2, 3, or 4 of the present invention, the phosphorus acid group and methacrylic anhydride group containing telomeric copolymers comprise from 2 to 20 wt. %, preferably, 4 wt. % or more, or, preferably, 15 wt. % or less of a phosphorus acid compound, such as, for example, a hypophosphite compound or its salt, e.g. sodium hypophosphite, based on the total weight of reactants (i.e. monomers, phosphorus acid group containing compounds and chain transfer agents) used to make the copolymers.

6. Preferably, in accordance with any of items 1, 2, 3, 4, or 5 of the present invention, the phosphorus acid group and methacrylic anhydride group containing telomeric copolymers of the present invention comprise the polymerization product of 100 wt. % methacrylic acid and/or its salts, based on the total weight of monomers used to make the copolymer.

7. Preferably, in accordance with any of items 1, 2, 3, 4, 5, or 6 of the present invention, the phosphorus acid group and methacrylic anhydride group containing telomeric copolymers of the present invention further comprise at least one imide group.

8. The compositions any of items 1, 2, 3, 4, 5, 6, or 7 of the present invention may comprise powders, pellets, or granules of the phosphorus acid group containing telomeric copolymers of methacrylic acid and/or its salts having an average of more than 70 wt. % to 99 wt. %, preferably, 72 wt. % or more, or, more preferably, 75 wt. % or more, of the polymerized carboxy acid units in the form of methacrylic anhydride, or suspensions thereof in non-aqueous carriers, such as oils, e.g. vegetable oils, glycols, polyglycols, ethers, glycol ethers, glycol esters and alcohols.

9. In another aspect, the present invention comprises methods for making a phosphorus acid group containing telomeric copolymer of methacrylic acid or their salts having an average of more than 70 wt. % to 99 wt. %, preferably, 72 wt. % or more, or, preferably, 98 wt. % or less, or, more preferably, 75 wt. % or more, of methacrylic anhydride groups, based on the total weight of methacrylic acid polymerized units in the copolymer, all anhydride percentages as determined by titration comprising melting under shear the telomeric copolymer of methacrylic acid or their salts at a temperature of 190 to 260° C., preferably, 205° C. or more or, preferably, 220° C. to 250° C., all temperatures being that of the telomeric copolymer. Preferably, the copolymers of methacrylic carboxy acids are pre-dried, such as, for example, by spray drying or oven drying to remove excess water.

As used herein, the term "carboxy acid" refers to carboxylic acids and salts thereof.

As used herein, the term "based on the total weight of monomers used to make the copolymer" refers to the total weight of addition monomers, such as, for example, vinyl or acrylic monomers used to make a telomeric copolymer but not to the chain transfer agents or any telomerizing phosphorus acid group containing reactants.

As used herein, the term "methacrylic acid polymerized units" refers to methacrylic acid and/or its salts in polymerized form.

As used herein, the term "molecular weight" or "Mw" refers to a weight average molecular weight as determined by aqueous gel permeation chromatography (GPC) using an Agilent 1100 HPLC system (Agilent Technologies, Santa Clara, Calif.) equipped with an isocratic pump, vacuum degasser, variable injection size auto-sampler, and column heater. The detector was a Refractive Index Agilent 1100 HPLC G1362A. The software used to chart weight average molecular weight was an Agilent ChemStation™, version B.04.02 with Agilent GPC-add on version B.01.01. The column set was TOSOH Bioscience TSKgel G2500PWxI 7.8 mm ID×30 cm, 7 µm column (P/N 08020) (TOSOH Bioscience USA South San Francisco, Calif.) and a TOSOH Bioscience TSKgel GMPWxI 7.8 mm ID×30 cm, 13 µm (P/N 08025) column. A 20 mM Phosphate buffer in MilliQ HPLC Water, pH ~7.0 was used as the mobile phase. The flow rate was 1.0 ml/minute. A typical injection volume was 20 µL. The system was calibrated using poly(acrylic acid), Na salts Mp 216 to Mp 1,100,000, with Mp 900 to Mp 1,100,000 standards from American Polymer Standards (Mentor, Ohio).

As used herein, the term "phosphorus acid containing" refers to a residue of a phosphorous, or hypophosphoric acid or its salt in the telomeric copolymer of the present invention.

As used herein, the term "telomer" or "cotelomer" refers to polymers and copolymers having a weight average molecular weight of 2000 or less comprising one or more residues of a phosphorus acid containing compound which acts as a telomerizing agent; above this molecular weight, such molecules are referred to as telomeric copolymers even though they contain one or more residues of a phosphorus acid containing compound.

As used herein, the term "TGA" or thermal gravimetric analysis refers to a method of determining weight loss and the thermal degradation temperature of a material in a nitrogen gas or air environment by heating it on a defined temperature ramp (defined in ° C./minute) and measuring the % of weight loss during the heating of the material.

As used herein, the term "titration" means, for any given telomeric copolymer, titration to determine acid to anhydride conversion % in a telomeric copolymer via acid number determination, separate anhydride content determination and comparison of the anhydride content determination to the acid number. The total free carboxylic acid content in any telomeric copolymer after melting under shear is measured by hydrolysis of the anhydride groups in the copolymer. A 0.1-0.2 g amount of each telomeric copolymer material is measured and put in a 20 ml glass vial. To this is added 10 ml of deionized (DI) water, followed by closing the vial and heating the closed vial in a 60° C. oven for 12 h. After 12 h, the contents of the vial is titrated against 0.5 N KOH (aq.) to determine the acid number of a hydrolyzed telomeric copolymer, giving the total free carboxylic groups in the copolymer, as moles KOH. Next, the anhydride content of the same telomeric copolymer is determined by reacting a separate 0.1-0.2 g sample of the telomeric copolymer along with 10 ml of tetrahydrofuran (THF) and 0.2-0.3 g of methoxy propyl amine (MOPA). MOPA opens the anhydride and reacts with one side of it, the other side is converted back to a carboxylic acid. For each material tested, the sample of the telomeric copolymer is added to a 20 ml glass vial equipped a with magnetic stirrer bar. The vial is closed and the mixture stirred at room temperature overnight (about 18-24 h). Following this, 15 ml of DI water is added and mixture was titrated against 0.5 NHCL (aq.) to get the amount of carboxylic acid groups remaining in the telomeric copolymer after reaction with MOPA (as moles 0.5 N HCl). For any polymer, subtracting the number of acid groups remaining after reaction with MOPA from the total free carboxylic groups in the product polymer indicates the reacted amount of MOPA and thus the % of conversion of carboxylic acid groups to anhydride groups. For phosphorus acid group containing poly(methacrylic acid), the % of conversion to anhydride groups is straightforward as only methacrylic acid monomer is used to make poly(methacrylic acid) or its salts. For copolymers, the anhydride conversion % is adjusted to account for any crosslinking of free carboxyl groups during processing as well as the comonomer concentration. To account for in process carboxyl group crosslinking in moles KOH, the total free carboxylic acid content of the starting poly(methacrylic acid) is determined by titration against aqueous 0.5 N KOH in the same manner used to get the total free carboxylic acid content of the product copolymer; the difference between the two represents crosslinked carboxyl groups. Then, to account for comonomer concentration, the % of conversion is divided by the wt. % of methacrylic acid or its salts used to make the starting material, based on the total weight of monomers used to make the starting copolymer to get a % conversion based on the total wt. % of methacrylic acid and/or its salts in the copolymer and not based on the weight of total copolymer solids. Instrument: Titralab™ TIM865 Titration Manager (Radiometer Analytical SAS, France); Reagents: 0.5 N KOH. 0.5 N HCl, Tetrahydrofuran (Sigma AldrichSt Louis, Mo.).

As used herein, the term "wt. %" stands for weight percent.

All ranges recited are inclusive and combinable. For example, a disclosed temperature of from 190 to 260° C., preferably, 205° C. or more or, preferably, 220° C. to 250° C., would include a temperature of from 190 to 260° C., from 190 to 250° C., from 205 to 250° C., from 205 to 220° C., from 220 to 250° C., and from 220 to 260° C.

Unless otherwise indicated, all temperature and pressure units are room temperature (22-23° C.) and standard pressure.

All phrases comprising parentheses denote either or both of the included parenthetical matter and its absence. For example, the phrase "(meth)acrylate" includes, in the alternative, acrylate and methacrylate.

The present inventors have discovered phosphorus acid group and methacrylic anhydride group containing telomeric copolymers that have a higher methacrylic anhydride percentage, based on the total weight of carboxy acid, salt or anhydride groups in the polymer, than any polymers previously known or disclosed. Such polymers are also much more thermally stable than known methacrylic anhydride containing polymers and are not as water soluble or moisture sensitive as poly(methacrylic acid) or poly(methacrylic acid) copolymers having known amounts of anhydride groups. Treating phosphorus acud group containing poly(methacrylic acid) (pMAA), its salts or any copolymers thereof by melt processing under shear converts a much higher percentage of carboxylic acid or salt groups in those pMAAs to their corresponding methacrylic anhydride groups to form the corresponding poly(methacrylic anhydride) (pMAAn) analogues. Further, the conversion of acid to anhydride takes much less time than has previously been known or expected. In addition, the resulting telomeric copolymers provide an added measure of thermal stability and thereby enable safe storage and processing of them, while avoiding loss of methacrylic anhydride groups and production of potentially toxic decomposition products during processing. The conductive heating and shear applied, for example, by an extruder is shown to be significantly more effective at converting polymethacrylic acid to polymethacrylic anhydride when compared to oven drying of pMAA.

The present inventors have thus achieved never before achieved levels of conversion rates of methacrylic acid groups to methacrylic anhydride groups, for example, more than 70 to as high as 99 wt. % of the (telomeric copolymers containing them, while treating the polymers at process temperatures substantially lower (about 40° C. lower) than temperatures reported in the literature as shown by TGA. See the Ho et al., article. Where telomers and homopolymers of phosphorus acid group containing pMAA are treated, it is even possible to form a corresponding telomer or polymer having 97 to 99 wt. % of methacrylic anhydride groups and 1 to 3 wt. % of methacrylic acid or salt groups.

The phosphorus acid group and methacrylic anhydride group containing telomeric copolymers of the present invention have on average at least one phosphorus atom in the polymer backbone that is bound to a carbon atom, as determined by 31-P NMR, as a terminal group such as a phosphinate or phosphonate having a vinyl polymer backbone substituent. The at least one phosphorus atom in the polymer backbone can be bound to two carbon atoms, as a phosphite along the carbon chain, such as a diphosphinate having two vinyl polymer backbone substituents. The varied structures of such polymers is described in U.S. Pat. Nos. 5,294,686 and 5,256,746.

The preferred phosphorus acid group and methacrylic anhydride group containing (telomeric copolymers of methacrylic acids and/or their salts contain as phosphorus acid groups those chosen from hypophosphite groups, alkyl or dialkyl phosphinates, or their salts. Such poly(anhydrides) formed from hypophosphite containing copolymers of methacrylic acids are thermally stable over a broad temperature range and do not readily char and decompose on treatment as do the corresponding telomers or polymers of methacrylic acid prepared in the absence of phosphorus acid group compounds. Unlike their poly(acrylic acid) or pAA anhydride analogues, hypophosphite containing copolymers of methacrylic acids and/or their salts can be thermally formed without decomposition. In fact, the methacrylic anhydride group containing hypophosphite copolymers of the present invention are stable to well over 300° C. Further, upon heating at temperatures above their anhydride formation temperature or dehydration temperature, such telomeric copolymers are white flakey solids. This is quite unlike mercaptan or persulfate (co) telomers or polymers of methacrylic acid or anhydride which are brown and appear charred after such heating. Accordingly, the methacrylic anhydride group containing telomeric copolymers of the present invention are particularly attractive, for example, as precursors for further chemistry such as, esterification, poly esterification and amidation and imidation, scale removers because they can be shipped in dry form and processed rapidly under demanding conditions, e.g. high heat.

The structure of the phosphorus acid and methacrylic anhydride group containing telomeric copolymers is not particularly limited. Carboxylic anhydrides of methacrylic acid can form from the acidic functions of neighboring acidic polymerized units along a single copolymer chain, from acidic functions of distal acidic polymerized units along a single copolymer chain, or from acidic functions of separate copolymer chains.

In accordance with the present invention, the phosphorus acid group containing poly(methacrylic acid) (pMAA) polymer or copolymer starting materials of the present invention can be prepared via phosphorus acid group compound, e.g. hypophosphorus acid and its sodium hypophosphite salt, chain transfer polymerization of methacrylic acid (MAA) by conventional aqueous solution polymerization methods, followed by melting them under shear in solution or in dry form at a temperature of 190° C. or higher, and up to 260° C., preferably, 205° C. or higher, and, preferably, 220° C. to 250° C. Heating time to convert more than 70 wt. % of carboxy acid groups is lower at higher temperatures and generally ranges from 30 seconds to 2 hours, or, preferably, 1 minute or more, or, preferably, 1 hour or less, more preferably, up to 3 minutes. The temperature is limited only by the need to avoid thermal degradation of the telomeric copolymer; however, time and temperature may readily be optimized for efficiency and low cost. As is understood by the ordinary skilled artisan, the speed at which such a process may be completed increases (all other things being equal) with an increase in processing temperature.

Suitable comonomers for use in making copolymers and cotelomers of methacrylic acid useful to make the methacrylic anhydride group containing polymers of the present invention may be any vinyl or acrylic monomer which is resistant to hydrolysis under processing (melting under shear)

conditions, such as methacrylamide and alkyl or dialkyl (meth)acrylamide or styrene, or which provides desirable flow properties in use, such as $C_1$ to $C_6$ alkyl (meth)acrylates, e.g. ethyl acrylate. The telomeric copolymers containing copolymerized (meth)acrylamide or their (di)alkyl amides will when polymerized and processed by melting under shear form amide or imide containing groups, such as malonamide, malonimide, succinamide, succinimide, adipamide and/or adipimide.

As for comonomer proportions suitable for making poly(methacrylic acid) starting materials for use in making the telomeric copolymers of the present invention, adding too much of any comonomer which is not water soluble, such as styrene, will result in a monomer mixture may be difficult to solution polymerize or which exhibits sluggish reaction kinetics. If one uses too much of any comonomer, one cannot achieve such a high proportion of methacrylic anhydride groups and may not achieve the corresponding thermal stability conferred by such groups.

The methacrylic anhydride group containing telomeric copolymers of the present invention can be prepared from poly(methacrylic acid) starting materials by any known melt processing methods which comprise shearing and heating the material. As is understood by the ordinary skilled artisan, "shear" means that the substrate material being melted under shear will provide resistance against the shearing device, element or mixer in processing, and that there will be at least some substrate material present at all times in the shearing device during processing. Suitable melt processing methods may include any continuous or batch processing methods known in the art for shearing, mixing, compounding, processing or fabrication of thermoplastic, elastomeric or thermosetting polymers or mixtures thereof. Methods include, for example, extrusion, such as in a single-screw or twin-screw extruder; kneading, such as in a single shaft or twin-shaft kneader reactor, banbury mixer, or a Buss-Kneader Reactor or Single screw reciprocating extruder/mixer; evaporation, such as in a wiped film evaporator or falling film evaporator vessel; heated mixing, such as in a continuous stirred tank reactor (CSTR) or single and twin-rotor mixers, for example, PLOUGHSHARE™ Mixers (Littleford Day Inc., Florence, Ky.), double arm mixers, sigma blade mixers, or vertical high intensity mixer/compounders; processing in a roll mill; a Brabender Plasticorder. An extruder or mixing vessel having one or more ports is a particularly desirable melt mixer, although by no means necessary.

Because the pMAA goes through a melt to form a solid anhydride (pMAAn), any dewatering technique can be used prior to or during anhydride formation, such as dewatering extrusion, oven drying, solvent precipitation or spray drying prior to melt formation.

Removal of water emitted during dehydration of the pMAA (i.e. as it is converted to pMAAn) can be carried out by such means as vacuum, and/or inert gas purge.

The phosphorus acid group and methacrylic anhydride group containing telomeric copolymers of the present invention display reactivity with polyols, and amino-polyols. Such reactivity makes such telomeric copolymers of methacrylic anhydride extremely versatile intermediates for the preparation of polymeric surfactants and detergent builders; such reactivity also makes the hypophosphite telomeric polymers of methacrylic anhydride useful as thermoset binders with various crosslinkers and organic extenders, such as dextrose; and as pigment dispersants.

The methacrylic anhydride group containing telomeric copolymers of the present invention find many uses, for example, as thermoset powder binders in combination with polyols, polyamines, alkanolamines, polysaccharides or reducing sugars; and as pigment dispersants, especially in the form of salts. Many uses in a wide variety of applications exist for the present invention. Such polymers are particularly useful as builders in detergent compositions, especially powder and liquid detergent compositions, scale removers, polymeric dispersants, such as pigment dispersants for various coatings applications, suspending agents for suspending particulate materials in fluid media, and the like. In addition, such polymers find use as polymeric binders for a textile and non-woven materials, such as glass fiber mats for roofing shingles and batting materials for insulation, and the like.

The following examples illustrate the present invention. Unless otherwise indicated, all parts and percentages are by weight and all temperatures are in ° C.

SYNTHESIS EXAMPLE A

A 5,300 weight average MW telomeric polymer of pMAA was polymerized from methacrylic acid in a 5 L reaction vessel heated to 98° C. with stirring in an aqueous solution in the presence of sodium hypophosphite hydrate in the amount of 9.0 wt. %, based on total weight of the methacrylic acid monomer. The resulting polymer was processed into the materials reported in Examples 1, 2, 3 and 4 in Table 1, below.

SYNTHESIS EXAMPLE B

A 16,000 weight average MW telomeric polymer of pMAA was polymerized from methacrylic acid in a 5 L reaction vessel heated to 98° C. with stirring in an aqueous solution in the presence of sodium hypophosphite hydrate in the amount of 4.0 wt. %, based on total weight of monomer. The resulting polymer was processed into the materials reported in Example 5 in Table 1, below.

SYNTHESIS EXAMPLE C

A 10,000 weight average MW telomeric copolymer was polymerized from a mixture of 90 wt. % methacrylic acid and 10 wt. % methacrylamide monomers in a 5 L reaction vessel heated to 98° C. with stirring in an aqueous solution in the presence of sodium hypophosphite hydrate in the amount of 6.0 wt. %, based on total weight of monomer. The weight average molecular weight of this copolymer is measured by GPC to be ~10,000. The resulting copolymer was processed into the materials reported in Example 6 in Table 1, below.

Each of the materials from Synthesis Examples A, B and C was pre-dried by spray drying (Ex A) and 150° C. in an oven for two hours (Exs B and C) to form a dry poly(methacrylic acid) material which is then subject to melting under shear.

EXAMPLES 1 TO 6

Melt Mixing to Form Phosphorus Acid Group and Methacrylic Anhydride Group Containing Telomeric Copolymers Mixing, comprising temperature and speed control, and data recording were done using a Haake PolyLab System™ Model P300(Thermo Electron, Karlsruhe, Germany); the system comprised (a) a Haake Rheomix™ 600P fitted with a R600 bowl (120 mL chamber volume, excluding rotors), in turn fitted with counter-rotating Roller Rotors (Rheomix™ 3000E) geared at a 3:2 ratio, (b) a Haake Rheocord™ used to measured the torque established between the rotors and (c) Control software (Polylab™ Monitor V 4.18) provided as part of the system and used to control rotor speed, temperature and record torque, equipment and melt temperature.

The Rheomix bowl was heated to 185° C. Then 35 g of the dry poly(methacrylic acid) material indicated in Table 1, below, was added to the bowl and the mixing bowl temperature was set at 190° C. The material was rotated at 50 rpm (rotor speed) until it melted as noted by a spike and fall in torque (between 10 and 40 minutes). Following this 15 additional grams of polymer were added and a nitrogen purge was placed on the bowl after a second torque spike was observed indicating mixing of the added power with the existing melt. The polymer was then mixed for 10 minutes. The temperature of the mixing bowl was then raised to the indicated set temperature and the polymer was mixed for 30 minutes. The temperature of the polymer during processing was monitored using the PolyLab system and associated software. At this point, the bowl was separated and set aside to cool down allowing the polymer to solidify. This was done allowing exposure to the ambient lab atmosphere. Solid material samples were taken for analysis at this point and subjected to the following tests:

Confirming Anhydride Formation: After melt mixing each resulting composition was ground by hand using a mortar and pestle to an approximate average particle size of 200 microns. Approximately 2 g of each ground material was place onto the crystal of an ATR sampling unit (Thermo Fisher Smart DuraSampIIR™, Fisher Scientific, Pittsburgh, Pa.) attached to an FTIR bench instrument (Thermo Fisher Nicolet™ 38FT-IR, Fisher Scientific), to collect the infrared spectrum. Analyze the spectrum using software (Thermo Fisher OMNIC™) with a particular focus at the 1800-1700 $cm^{-1}$ region of the sample spectrum. The presence of peaks at 1800 cm-1 and at 1750 $cm^{-1}$ indicated the conversion from pMAA to pMAAn. Additionally, the carboxylic acid peak at 1700 $cm^{-1}$ decreased or merely became a shoulder on the peak at 1750 $cm^{-1}$.

Degradation Analysis: Gel permeation size exclusion chromatography (GPC Mw) was run on each Example to confirm that no thermal degradation (e.g. backbone scission) took place. Molecular weight of the final material (pMAAn rehydrated to pMAA) was compared to the starting pMAA to confirm that no thermal degradation has taken place.

Titration to Determine Acid to Anhydride Conversion % in Poly(Methacrylic Anhydride) (pMAAn) Polymer Via Acid Number: The total free carboxylic acid content of the starting poly(methacrylic acid) or poly(methacrylic acid) copolymer material was measured by weighing a 0.1 to 0.2 g sample of the material and placing it in a 20 ml glass vial to which 10 ml deionized (DI) water was added and the vial contents titrated against aqueous 0.5 N KOH to determine the acid number of and, thus the total free carboxylic groups in the starting material as moles 0.5 N KOH. The total free carboxylic acid content of the product copolymer was measured by hydrolysis of the anhydride. A 0.1-0.2 g amount of each telomeric copolymer material was weighed and put in a 20 ml glass vial, which was then closed. To this was added 10 ml of (DI) water was added and the closed vial was heated in 60° C. oven for 12 h. After 12 h the vial was titrated against 0.5 N KOH (aq.) to determine the acid number of the hydrolyzed telomeric copolymer, giving the total free carboxylic groups in the polymer as moles 0.5 N KOH. Next, the anhydride content was determined by reacting a separate sample of each telomeric copolymer material with methoxy propyl amine (MOPA). For each material tested, a 0.1-0.2 g sample of each telomeric copolymer material was weighed and placed along with 10 ml of tetrahydrofuran (THF) and 0.2-0.3 g of MOPA was added to a 20 ml glass vial equipped a with magnetic stirrer bar. The vial was closed and the mixture was stirred at room temperature overnight (about 18-24 h). Following this 15 ml of DI water was added and mixture was titrated against 0.5 NHCL (aq.) to determine the anhydride content. This titration determined the overall number of carboxylic acid groups remaining in the telomeric copolymer after reaction with MOPA, expressed as moles 0.5 N HCl. That number is divided by the total free carboxylic acid content of the product copolymer as moles to give the conversion %. For copolymers, crosslinked carboxyl groups (determined as the total free carboxylic acid content of the starting material minus the total free carboxylic acid content of the product copolymer) and the carboxylic acid groups remaining after reaction with MOPA (as moles 0.5 N HCl) were subtracted out to give only the number of MOPA groups reacted; this number is doubled to give the number of anhydride groups formed as moles. Then, total conversion was divided by the wt. % of methacrylic acid or its salts used to make the starting material, based on the total weight of monomers used to make the starting copolymer, to get a % conversion based on the amount of methacrylic acid and/or its salts. Instrument: Titralab™ TIM865 Titration Manager (Radiometer Analytical SAS, France); Reagents: 0.5 N KOH. 0.5 N HCl, Tetrahydrofuran (Sigma Aldrich. St Louis, Mo.).

The following table list the polymer used and the conditions it was exposed to.

TABLE 1

Inventive Polymer Compositions and Analyses

| Example | Polymer | Temperature (° C.) (set) | Temperature Range of the Polymer (° C.) | Anhydride Conversion (%) |
|---|---|---|---|---|
| 1 | pMAA 5,300 Mw (9% SHP) | 225 | 204-224 | 83.92 |
| 2 | pMAA 5,300 Mw | 235 | 209-229 | 88.22 |
| 3 | pMAA 5,300 Mw | 245 | 209-239 | 91.20 |
| 4 | pMAA 5,300 Mw | 255 | 211-246 | 97.28 |
| 5 | pMAA 16,000 Mw (4% SHP) | 225 | 212-228 | 96.84 |
| 6 | pMAA-co-MAm (6% SHP) | 225 | 212-239 | 82.26 |

As shown in Table 1, above, each of the inventive (co)polymer compositions contains from nearly 84 wt. % to over 97 wt. % of methacrylic anhydride groups, based on the total weight of polymerized methacrylic acid and/or salt monomer groups. The Table 1 results demonstrate an unheard of conversion of acid to anhydride groups. Further, each product was off-white; this indicates thermal stability and a lack of thermal degradation.

To confirm the thermal stability of the polymers used in each of the Examples, above, a gel permeation chromatography (GPC) was performed after melt mixing to show the lack of thermal degradation. Results are shown in Table 2, below.

GPC Procedure for Anhydride Group Containing Telomeric Copolymers: A 10-20 mg sample of each indicated (co)polymer was dissolved in 5 mL of a phosphate buffer solution. The resulting solutions were heated in a 60° C. oven to revert the anhydride back to the acid. The solution was then filtered through a 0.45 micron filter and injected onto an Agilent 1100 series aqueous HPLC analyzer (Agilent Technologies, Santa Clara, Calif.). The value reported in Table 2, below is the weight average molecular weight (Mw).

As shown in Table 2, below, the molecular weight in Control Examples A, B and C of the methacrylic acid group containing polymer prior to anhydride group conversion is the same as the molecular weight after rehydration of the anhydride, and within the experimental error in GPC Mw. Accordingly, there has been no thermal decomposition of any of the polymers and copolymers in Examples 1-6 during the thermal processing at the set temperature of the mixing device (Thermal Duty). This was also confirmed by the acid number determination, above, which did not show decarboxylation after thermal processing.

TABLE 2

Confirming Thermal Stability

| Example | Starting Material | Thermal Duty followed by re-hydration to the acid | Mw (GPC) |
|---|---|---|---|
| A (control) | pMAA 5,000 Mw | NA | 5,345 |
| 1 | pMAA 5,000 Mw | 225° C. | 5,366 |
| 2 | pMAA 5,000 Mw | 235° C. | 5,290 |
| 3 | pMAA 5,000 Mw | 245° C. | 5,270 |
| 4 | pMAA 5,000 Mw | 255° C. | 5,340 |
| B (control) | pMAA 16,000 Mw | NA | 15,763 |
| 5 | pMAA 16,000 Mw | 225° C. | 16,300 |
| C (control) | pMAA-co-MAm | NA | 10,076 |
| 6 | pMAA-co-MAm | 225° C. | 10,496 |

We claim:

1. A polymer composition comprising at least one phosphorus acid group and methacrylic anhydride group containing telomeric copolymer of methacrylic acid and/or its salts having an average of more than 70 wt. % to 99 wt. % of methacrylic anhydride groups, based on the total weight of methacrylic acid polymerized units in the copolymer, all anhydride percentages as determined by titration, and having a weight average molecular weight (Mw) of from 1,000 to 100,000.

2. The polymer composition as claimed in claim 1, wherein the weight average molecular weight (Mw) ranges from 2,000 to 40,000.

3. The polymer composition as claimed in claim 1, wherein the telomeric copolymer of methacrylic anhydride has on average at least one imide group.

4. The polymer composition as claimed in claim 1 comprising 72 wt. % or more of methacrylic anhydride groups, based on the total weight of methacrylic acid polymerized units in the corresponding copolymer.

5. The polymer composition as claimed in claim 1, wherein the telomeric copolymer is the copolymerization product of from 0.1 to 25 wt. %, based on the total weight of monomers used to make the cotelomer or copolymer, of a vinyl or acrylic comonomer which is resistant to hydrolysis under processing conditions.

6. The polymer composition as claimed in claim 5, wherein the vinyl or acrylic monomer is chosen from acrylamide, methacrylamide, $C_1$ to $C_6$ alkyl methacrylamides, $C_1$ to $C_6$ dialkyl methacrylamides, styrene and alpha-methyl styrene, sulfonated styrene, sulfonated acrylamide, isopropylacrylamide, t-butylacrylamide, acrylonitrile, methyl methacrylate, cyanostyrene, hydroxystyrene, ethyl acrylate.

7. The polymer composition as claimed in claim 1, wherein the telomeric copolymer comprises from 2 to 20 wt. %, of a phosphorus acid compound, based on the total weight of reactants used to make the telomeric copolymer.

8. The polymer composition as claimed in claim 1, wherein the at least one phosphorus acid group is bound to a carbon atom of the polymer backbone, is a hypophosphite, its salt, an alkyl phosphinate, a dialkyl phosphinate, or a mixture thereof.

9. The polymer composition as claimed in claim 1 which is in the form of a powder, pellet, granule, or a suspension in a non-aqueous carrier.

10. A method of making a phosphorus acid group and methacrylic anhydride group containing telomeric copolymer of methacrylic acid and/or its salts having an average of more than 70 wt. % to 99 wt. % of methacrylic anhydride groups, based on the total weight of methacrylic acid polymerized units in the copolymer, all anhydride percentages as determined by titration, comprising melting under shear the telomeric copolymer of methacrylic acid at a temperature of from 190 to 260° C., all temperatures being that of the telomeric copolymer.

* * * * *

UNITED STATES PATENT AND TRADEMARK OFFICE
CERTIFICATE OF CORRECTION

| | | |
|---|---|---|
| PATENT NO. | : 8,859,686 B2 | Page 1 of 1 |
| APPLICATION NO. | : 14/208500 | |
| DATED | : October 14, 2014 | |
| INVENTOR(S) | : Charles J. Rand et al. | |

It is certified that error appears in the above-identified patent and that said Letters Patent is hereby corrected as shown below:

On the Title Page, (71) Applicant, please add --Dow Global Technologies LLC--.

Signed and Sealed this
Third Day of March, 2015

Michelle K. Lee
*Deputy Director of the United States Patent and Trademark Office*